D. POLLARD.
VEHICLE TIRE.
APPLICATION FILED NOV. 7, 1908.
927,676.
Patented July 13, 1909.
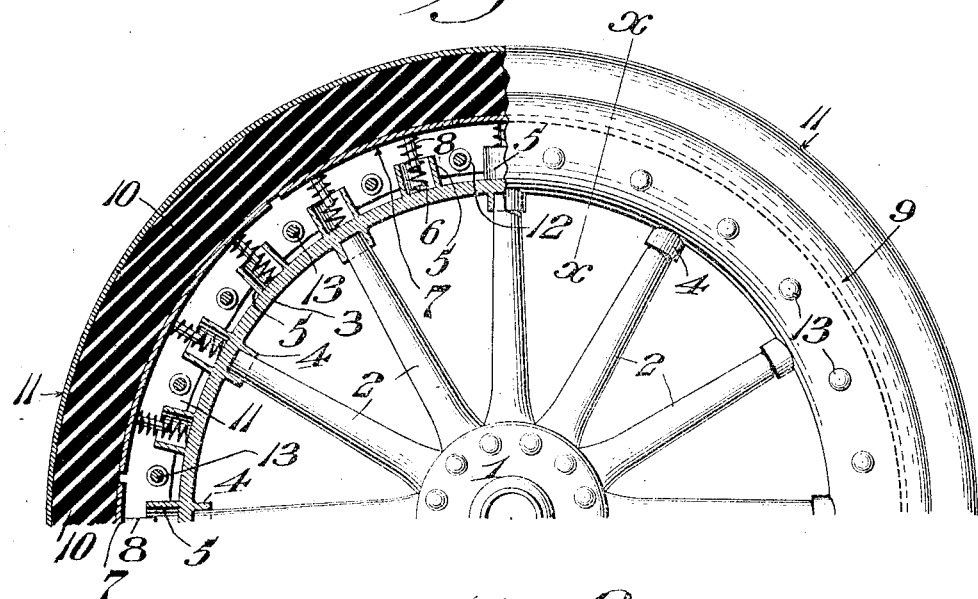
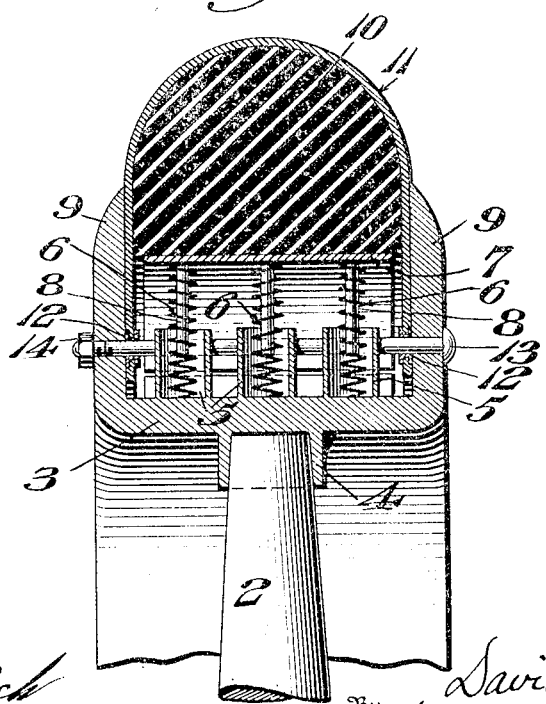
Witnesses
H. S. Dieterich
O. F. Nagle
Inventor
David Pollard.
By Wiedersheim & Fairbanks
Attorneys

UNITED STATES PATENT OFFICE.

DAVID POLLARD, OF PHILADELPHIA, PENNSYLVANIA.

VEHICLE-TIRE.

No. 927,676.

Specification of Letters Patent.

Patented July 13, 1909.

Application filed November 7, 1908. Serial No. 461,454.

*To all whom it may concern:*

Be it known that I, DAVID POLLARD, a citizen of the United States, residing at Philadelphia, in the county of Philadelphia, State of Pennsylvania, have invented a new and useful Vehicle-Tire, of which the following is a specification.

My invention relates to a new and useful tire for vehicle wheels and consists in forming a spring support for the bearing or tread of the tire with means for suitably holding the same in position with respect to the wheel.

It further consists of other novel features of construction, all as will be hereinafter fully set forth.

Figure 1 represents a partial side view. Fig. 2 represents a sectional view on line x—x Fig. 1.

Similar numerals of reference indicate corresponding parts in the figures.

Referring to the drawings:—in the vehicle tires now in use one of the most serious objections which arises is that of puncturing and replacing of the tires, while in the solid tires in use it is difficult to obtain sufficient resiliency.

My invention is designed to overcome these defects and in the drawings I have shown a construction which will operate successfully, but it will be evident that the arrangement of the parts may be varied, other instrumentalities may be employed and the construction may be changed without departing from the spirit of my invention, and I do not therefore desire to be limited in every instance to the exact construction as herein shown and described, but desire to make such changes as may be necessary.

1 designates a portion of the hub of a wheel which may be of any desired form and from which extend the spokes 2.

3 designates a metal rim which is suitably connected with the spokes 2 in the present instance by means of the bosses 4 into which the ends of the spokes 2 enter and which suitably seat the same. Projecting from the opposite side of the rim 3 are the tubular extensions 5 which are adapted to receive the coil springs 6, the ends of which preferably bear against the rim 3.

7 designate metal plates extending across the wheel which may be of any desired form and thickness and which are provided with the pins 8 extending inwardly and which are adapted to enter the springs 6, the ends of which latter preferably bear upon the inner face of one of the said plates 7, which are properly situated therefor.

9 designates flanges which extend from each side of the rim 3 and between which it will be understood the plate 7 is seated, said flanges being also adapted to receive a portion of the solid tire or tread 10 which is preferably of rubber although any other suitable material may be employed, said tire 10 being surrounded by a casing 11 of canvas or any other suitable material which extends inwardly between the flanges 9 and is provided, at suitable points around the same with the eyelets 12 through which are adapted to pass the bolts 13 which also pass through suitable openings in the flanges 9 and which are locked in position by the nut 14.

From the above it will be understood that I have provided a solid tread for the tire which is resiliently supported by means of the springs 6, which is prevented from outward displacement by reason of the casing 11 and in which improper and undue side movement thereof is prevented by means of the flanges 9. It will thus be seen that puncturing of the tire is obviated and at the same time a resilient support for the tread is provided.

Having thus described my invention, what I claim as new and desire to secure by Letters Patent, is:—

1. In a tire for vehicle wheels, a rim formed with parallel vertical flanges, circumferentially disposed plates, springs interposed between said plates and the body portion of the rim, a solid tread mounted upon said plates, and a flexible casing enveloping said tread and having portions extended between the flanges of said rim, means passed through said flanges and securing said casing thereto, said plates being independent of the tread and casing.

2. In a tire for vehicle wheels, a rim formed with parallel vertical flanges, and upon one side of its body portion with integral bosses to receive the ends of the spokes and upon the other side with integral tubular extensions, a series of plates disposed between the flanges of the rim, springs interposed between said plates and the body of the rim and received in said tubular extensions, a solid tread mounted upon said plates and a casing enveloping said tread and extending within the flanges of the rim, means passed through said flanges and securing said casing thereto intermediate the plates and the body portion of the rim.

DAVID POLLARD.

Witnesses:
WM. CANER WIEDERSEIM,
J. C. MCGLASHEN.